United States Patent [19]
Combes

[11] 3,789,866
[45] Feb. 5, 1974

[54] PRESSURIZED FLUID VALVES

[75] Inventor: Robert P. Combes, La Valette, France

[73] Assignee: Societe Pour Le Developpement De La Recherche Appliquee, Toulon, France

[22] Filed: Oct. 27, 1972

[21] Appl. No.: 301,351

[52] U.S. Cl. .............................. 137/219, 137/220
[51] Int. Cl. ............................................ F16k 31/06
[58] Field of Search .................... 137/219, 221, 222

[56] References Cited
UNITED STATES PATENTS

| | | | |
|---|---|---|---|
| 2,841,359 | 7/1958 | Berck | 137/219 X |
| 3,650,289 | 3/1972 | Locke | 137/219 |
| 3,240,224 | 3/1966 | Horl | 137/219 |
| 3,119,405 | 1/1964 | Guy | 137/219 |
| 2,950,732 | 8/1960 | Lambert | 137/219 |
| 2,833,299 | 5/1958 | Marriette | 137/221 |

Primary Examiner—Harold W. Weakley
Attorney, Agent, or Firm—Brooks Haidt & Haffner

[57] ABSTRACT

A valve for controlling the flow of pressurized fluid comprising a hollow, cylindrical valve body having a hollow, cylindrical obturator slidably mounted therein, the exterior of the obturator being spaced, along most of its length, from the inner surface of the body, to provide space for receiving the pressurized fluid. The space is closed at its forward end by contact means on the obturator contacting a seat on the body. The obturator is supported internally by a first male guide piece mounted from the body and slidably contacting the inner surface of the obturator at its rearward end, a rod co-axial with the obturator and supported by the first guide piece and a second male guide piece mounted on the rod and slidably contacting the inner surface of the obturator at its forward end. A piston slidably mounted within the obturator, on the rod and between the guide pieces, forms, in its forward position, a starting chamber with the second guide piece, in a position rearward of the forward position, a control chamber with the second guide piece, the rod and the inner surface of the obturator and at its rear side, a closing chamber with the rod, the first guide piece and the inner surface of the obturator. When the piston moves rearward it engages a stop on the obturator and causes it to move with the piston. A fluid duct through the rod and the second guide piece connects the start chamber to the atmosphere at the forward end of the obturator, and fluid ducts, for control purposes, extend from exteriorly of the body to the start, control and closing chambers to cause movement of the piston and hence, the obturator.

6 Claims, 1 Drawing Figure

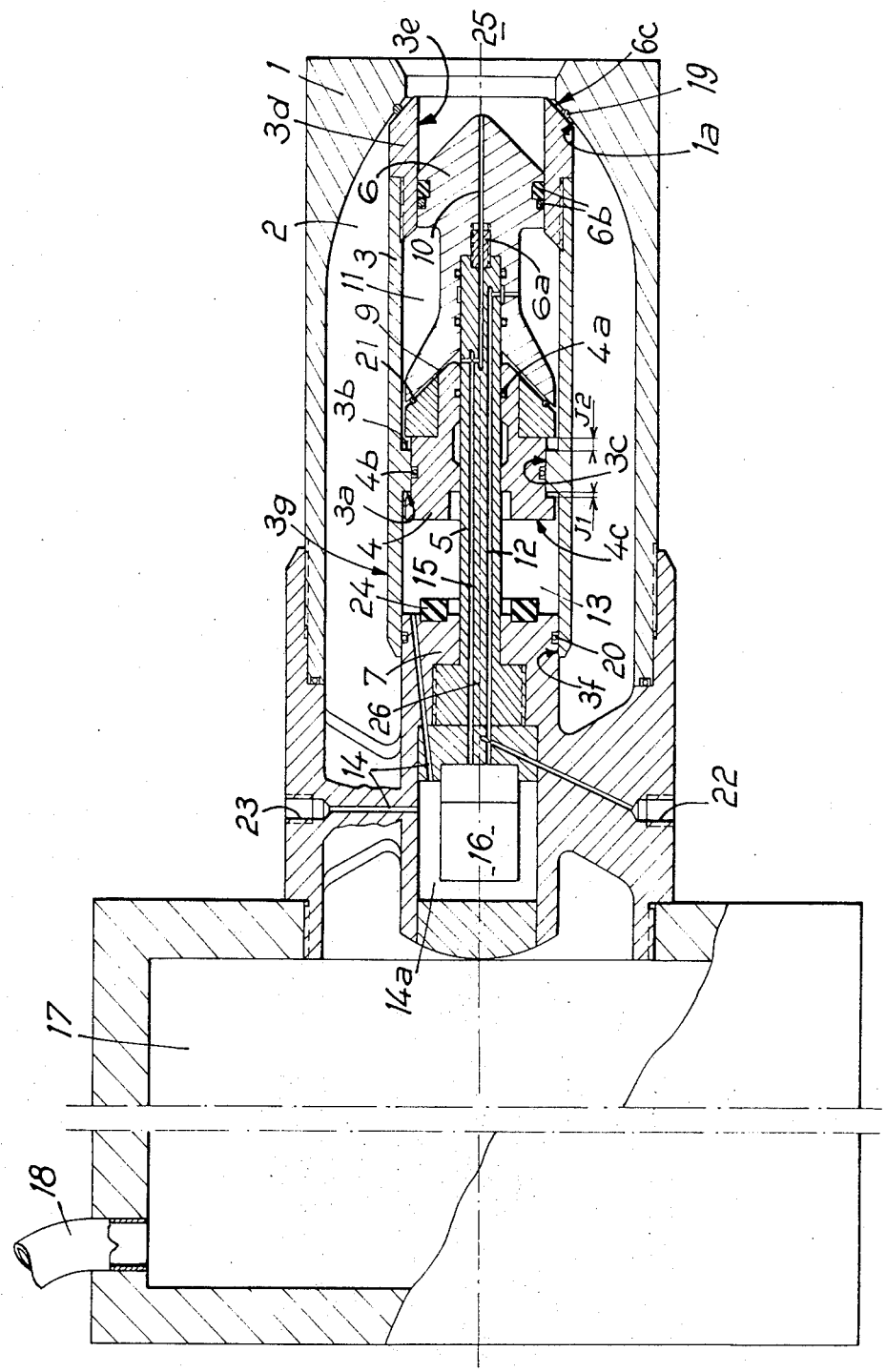

PRESSURIZED FLUID VALVES

The present invention relates to a valve for controlling pressurized fluid.

Hitherto known valves comprise a valve body connected by threaded parts to, for example, a reservoir containing a pressurized fluid, and an obturator member enabling said reservoir to be connected to atmosphere. In these valves, the control of the obturator member is accomplished by a force transmission mechanism, which is generally mechanical, the various elements constituting the mechanism following one another.

This arrangement has several drawbacks including a considerable bulk for the valve and possibly a disturbance in the flow of the fluid in the valve body, caused by the non-streamlined elements, such as bearings, transmission rods, etc. disposed in said body.

The invention has, as one object, the elimination of these disadvantages and to this end, provides a valve which enables an undisturbed flow with axial symmetry to be obtained.

The preferred embodiment of the invention comprises a valve constituted by:
  a valve body,
  an obturator comprising a hollow obturator body located inside said valve body and provided with an inner fluid conduit which opens to the atmosphere from said obturator body through the forward end of such obturator body near the valve seat contact member coupled with the obturator and the obturator comprising an inner bore and an inner cylindrical bearing,
  a male guide piece coupled to the valve body by means of a cylindrical rod and with respect to which said inner bore is mounted to slide in a fluid-tight manner,
  a seat on said valve body,
  said contact member providing fluid-tight contact with said seat,
  a device for controlling the position of the obturator, which is disposed inside the obturator body and which comprises a piston mounted to slide in a fluid-tight manner with respect to the one hand to said cylindrical rod and on the other hand to said cylindrical bearing, and capable of being in fluid-tight contact with the male guide piece, at which time a start chamber is then defined by said piston, said male guide piece and said cylindrical rod;
  a source of pressurized fluid;
  and a conduit arranged in this cylindrical rod and connecting said start chamber to said source of pressurized fluid.

The obturator body advantageously has an outer surface having a longitudinal section which is oblong with a main body portion which is substantially cylindrical, such shape being adapted to the generation of fluid flows which are axially symmetrical in the valve body.

Finally, the inner fluid conduit preferably opens to the atmosphere from the obturator body at the forward end of this obturator body, at its axis and adjacent the contact member coupled with the obturator and another male guide piece mounted from the valve body and slidably supports the rearward end of the obturator body.

The invention will be more readily understood, and the secondary characteristics and their advantages will be apparent from, the following description of a presently preferred embodiment given by way of example. Reference will be made to the accompanying drawing, in which the single drawing shows a longitudinal section through a valve according to the invention.

The valve comprises a body 1 which is connected at its rearward end by screwing it into a wall of a reservoir 17 of compressed fluid, the reservoir 17 being connected to a source of pressurized fluid (a pump or a compressor) by means of a conduit 18. Such valve also comprises an obturator body 3 which is coupled in translation with a piston 4 itself mounted to slide with respect to a rod 5, secured to the body 1 of the valve. A sealing gasket 4a is interposed between the inner bore of the piston 4 and the rod 5.

The piston 4 is limited in movement with respect to the body 3 of the obturator by means of two shoulders 3a and 3b, integral with the body 3 of the obturator and on either side of which, the piston 4, which to this end is made in two parts, is assembled with an assembly clearance $J_1$ and $J_2$. Moreover, the body 3 of the obturator comprises an inner ring portion 3c between the two shoulders 3a and 3b, this ring portion 3c acting as a cylindrical bearing with respect to which the piston 4 may move, a sealing gasket 4b being interposed between the ring portion 3c and the piston 4.

It will be noted that a guide piece 6 is fixed to the end of the rod 5, by means of a threaded connection 6a. Furthermore, at its forward end, the body 3 of the obturator comprises an end ring 3d which is unitary therewith, the ring 3d being screwed on the body 3 in the present case, and which, on the one hand, has an inner cylindrical bore 3e, which may move with respect to a part of the guide piece 6 and the interposed sealing gasket 6b. The ring 3d is provided with an abutment face 6c which contacts the seat 1a of the body 1 of the valve, an annular sealing gasket 19 being interposed between the face 6c and the seat 1a.

The rearward end of the body 3 of the obturator, opposite to the end at which the ring 3d is mounted, also has an inner bore 3f which is disposed around a second male guide piece 7, with an interposed sealing gasket 20.

It will also be noted that the piston 4 may be disposed as shown in the drawing, in which position it is in contact with the guide piece 6 an annular sealing gasket 21 being interposed between the piece 6 and the piston 4. In this position of the piston 4, a so-called "starting" chamber 9 is constituted and defined by the guide piece 6, the rod 5, the piston 4 and by the sealing gaskets 4a and 21. A conduit 15 is bored in the rod 5 and connects said chamber 9 to the chamber of an electrically operable valve 16 capable of placing, selectively, the conduit 15 into communication with another conduit 12, also bored in the rod 5, or of isolating the conduits 15 and 12.

When the gasket 21 is in contact, at the same time, with the opposing faces of the piston 4 and of the guide piece 6, said piston 4 and the guide pieces 6 and 7 define two chambers, a so-called "control" chamber 11, in cooperation with the sealing gaskets 4b and 6b, and a so-called "closing" chamber 13, in cooperation with the rod 5, and the sealing gaskets 4a, 4b and 20. The conduit 12 permanently connects the chamber 11 to an aperture 22 for the admission of fluid under a predetermined pressure.

Furthermore, the conduit 15 has an extension — conduit 10 — which opens to the atmosphere outside of the forward end of the obturator 3 of the valve. An aperture 23, for connection to a source of fluid under a predetermined pressure, is connected, by means of conduits 14 and an intermediate chamber 14a, to the chamber 13. Inside this same chamber 13, adjustable pieces 24, forming an abutment, are fixed to the base of the second guide piece 7 and are disposed opposite the base 4c of the piston 4.

Finally, it will be noted that the reservoir 17 is in communication with a chamber 2 defined, inside the body 1 of the valve, by said body 1 and by the obturator body 3. When the face 6c of the body 3 no longer tightly abuts the seat 1a of the body 1 of the valve, the chamber 2 is in communication with the space 25 outside the valve. Moreover, the cross-section of the outer face 3g of the body 3 of the obturator is, in the present case, circular and is practically a continuous extension of the outer face of the second male guide piece 7. Moreover, it will have been noted that the body 3 of the obturator is substantially symmetrical with respect to the axis 26 of the body 1 of the valve.

The advantages of the valve which has just been described will be more readily seen on reading the following description of the operation thereof.

The mode of dynamic displacement of the obturator 3 will be described first and will be followed by a description of the principal characteristics of the valve provided with said obturator.

The valve, disposed as shown in the drawing, is obturated by the obturator 3 which isolates the chamber 2 from the outer space 25. To control the opening of the valve, the pressurized fluid inlet, the aperture 22, is placed in communication with the conduit 15, by means of the electrically operable valve 16. The "starting" chamber 9 is thus fed with pressurized fluid, this causing the piston 4 to move back with respect to the guide piece 6. Consequently, the starting and control chambers 9 and 11 are then placed in communication. As, moreover, the chamber 11 is filled with pressurized fluid by means of the conduit 12 and the aperture 22, the piston 4 which, initially, was rapidly displaced in view of the small volume of the chamber 9, continues to move back under the action of the fluid of the chamber 11. It therefore succeeds in eliminating the clearance $J_2$ and, by abutting the shoulder 3b, in detaching, in a very short time, the face 6c of the body 3 of the obturator from the seat 1a of said obturator. The obturator moves freely and rapidly, and the valve opens wide, thus permitting a satisfactory flow of the pressurized fluid contained in the chamber 2 towards the outer space 25. The characteristics of this flow will be specified later.

Since the starting chamber 9 is in communication with the outer space 25 by way of the conduit 10, the pressure in this chamber drops. When the pressure in the closing chamber 13 has become greater than that of the starting chamber 9, the piston 4 moves in the direction of closure of the valve and the valve closes.

It is seen, therefore, that the law of opening, if the displacement of the obturator is related with time, is governed by the system of forces applied to the piston during the opening, i.e., by the different pressures prevailing in the starting and closing chambers 9 and 13.

These pressures may be chosen and fixed independently of the pressure of the reservoir 17. In time, they are also a function of the variations in volume which may or may not be appreciable.

On the other hand, the variation in the section of the valve opening, between the face 6c and the seat 1a, as a function of the displacement of the body 3 of the obturator, and thus as a function of time, is associated with the shape given to the seat 1a of the obturator. In the example given, the seat 1a is of such shape that the variation in section, as a function of the distance of the body 3, is linear. By changing the shape of the obturator seat, other laws of displacement may be chosen.

The law of opening of the valve, or the law of variation of the section of opening, is in addition associated with the following numerous adjustable parameters;

the pressures in the control and closure chambers 11 and 13 respectively;

the variations of these pressures as a function of the displacement of the body 3 of the obturator;

the section of the passage between the control chamber 11 and starting chamber 9 which is adjustable thereby permitting a certain law of flow between these two chambers 9 and 11 to be imposed.

The maximum section of the valve opening may be regulated by the stroke of the piston 4 which may be limited by means of the stops 24.

The valve has an identical functioning for gases and for liquids, and the opening control 16 may be either pneumatic or hydraulic. The pressures may reach several hundreds of bars, this giving a range of opening time of between a millisecond and a minute.

The sections subjected to pressure are such that the valve, in the closed position, remains closed even if one of the chambers, viz. the control chamber 11, the closing chamber 13 or the chamber 2, contains a fluid under pressure.

The electrically operable valve 16 may be placed outside the actual valve, this being preferred when said valve works with gases or liquids at high temperature.

The general properties of the valve will now be described, and note will be made of the fact that all of the control devices are contained in the body of the obturator.

This arrangement is particularly advantageous from several points of view.

It will firstly be noted that, as compared to the prior art, the length of control transmission mechanisms have been considerably reduced between the abutment face 6c of the body 3 of the obturator and the piston 4. This reduction in the length of the control transmission mechanism is of course advantageous per se, because it permits a reduction both of the total size of the valve and of the weight of said valve.

This reduction in length of the transmission mechanism is furthermore advangageous because it leads to the obtaining of excellent characteristics of opening and closing of the valve, which were impossible to obtain previously due to the considerable inertia of the prior known transmission mechanisms.

All these novel characteristics are, of course, associated with the design of a hollow obturator body 3. However, it has been necessary to solve the problems of guiding said body 3, this having been accomplished by designing the guide pieces 6 and 7 and by disposing these pieces, one at a first end of the body 3, the other at the second end of said body 3.

The fact that the piston 4 for controlling the displacement of the body 3 of the obturator has been disposed inside said body has also led to the provision of the pressurized fluid feed of the starting chamber 9, which is advantageously accomplished by means of a conduit 15 bored in the central rod 5 secured to the body 1 of the valve.

Finally, it has been considered judicious to benefit from the stream-lining of the valve control device, which is obtained by the body 3 of the obturator, and to give this stream-lining such a profile that the aerodynamic or hydrodynamic flows of fluid about said body 3 are almost free of disturbances which were previously caused by the numerous appendages disposed inside the chamber 2 of the prior known valves. Consequently, the fluid flow obtained has axial symmetry with respect to axis 26, this being particularly sought after for applications in jet engines, particularly aerodynamic ones.

I claim:

1. A valve for controlling fluid flow, said valve comprising:

a hollow valve body having a valve seat at a forward end thereof, a hollow obturator slidably mounted within said valve body and having contact means at a forward end thereof contactable with said seat, said obturator also having an outer fluid-tight wall portion spaced from the inner surface of said body and rearwardly of said forward end thereof to provide a space for receiving the fluid to be controlled and directing it toward said forward end of said obturator and said obturator being movable from a first position in which said contact means engages said seat and prevents the flow of fluid out of said space to a second position in which said contact means is spaced from said seat and permits the flow of fluid out of said space, fixed position closure means mounted from said body and within said obturator and having a first portion in fluid-tight, sliding contact with the inner surface of said obturator at said forward end of said obturator, said closure means having a second portion extending rearwardly and away from said first portion thereof which is spaced from said inner surface of said obturator, a piston slidably mounted in said obturator adjacent to and rearwardly of said second portion and having fluid-tight contact with said inner surface of said obturator, said piston being movable from a first position in which a portion thereof contacts said second portion of said closure means but has another portion thereof spaced from said second portion of said closure means to form a starting chamber between said piston and said second portion, to a second position in which it is out of contact with said second portion and forms a control chamber with said second portion and said inner surface of said obturator, stop means on said obturator engageable by said piston when it moves to said second position thereof to cause movement of said obturator with said piston, means for urging said piston toward said first position thereof, first fluid conduit means extending from said start chamber to the atmosphere at said forward end of said obturator, and second fluid conduit means extending from exteriorly of said body to said start chamber and to said control chamber for supplying fluid under pressure to said start chamber, and thereby moving said piston away from said first position thereof, and to said control chamber and thereby continuing the movement of said piston away from said first position thereof.

2. A valve as set forth in claim 1, wherein said obturator has a substantially cylindrical outer surface which tapers at its forward end to a smaller diameter than the remainder thereof, and said inner surface of said body is symmetrical with respect to the axis of said outer surface to provide, in said second position of said obturator, a symmetrical passageway between said outer surface of said obturator and said inner surface of said body for the flow of said fluid therebetween.

3. A valve as set forth in claim 2, further comprising further fixed position closure means mounted from said body and within said obturator and having a portion in fluid-tight sliding contact with the inner surface of said obturator at a portion of the latter which is spaced rearwardly thereof with respect to the portion thereof which is engaged by said piston to provide a closing chamber between said further closure means and said piston and further fluid contact means extending from said closing chamber to exteriorly of said obturator.

4. A valve as set forth in claim 3, wherein said first fluid conduit means extends from said start chamber to a point on the axis of said outer surface and radially adjacent to said contact means.

5. A valve as set forth in claim 1, further comprising fixed position closure means mounted from said body and within said obturator and having a portion in fluid-tight sliding contact with the inner surface of said obturator at a portion of the latter which is spaced rearwardly thereof with respect to the portion thereof which is engaged by said piston to provide a closing chamber between said further closure means and said piston and further fluid conduit means extending from said closing chamber to exteriorly of said obturator, a rod extending from said last-mentioned closure means to said first mentioned closure means through said piston, said piston being slidable on said rod, and wherein said first fluid conduit means comprises a first channel in said rod and extending through said first-mentioned closure means, and said second fluid conduit means comprises a second channel in said rod and extending through said first-mentioned closure means and said further fluid conduit means comprises a third channel extending through said further closure means.

6. A valve as set forth in claim 5, further comprising valve means for interconnecting said first and second channels for fluid flow therebetween.

* * * * *

UNITED STATES PATENT OFFICE
CERTIFICATE OF CORRECTION

Patent No. 3,789,866                Dated February 5, 1974

Inventor(s)   Robert P. Combes

It is certified that error appears in the above-identified patent and that said Letters Patent are hereby corrected as shown below:

Front Page:

Identifier [30] has been omitted and should read:

Foreign Application Priority Data

Oct. 29, 1971   France      7139095

Signed and sealed this 21st day of May 1974.

(SEAL)
Attest:

EDWARD M.FLETCHER, JR.
Attesting Officer

C. MARSHALL DANN
Commissioner of Patents